(12) United States Patent
Kish et al.

(10) Patent No.: US 10,019,788 B1
(45) Date of Patent: Jul. 10, 2018

(54) MACHINE-LEARNING MEASUREMENTS OF QUANTITATIVE FEATURE ATTRIBUTES

(71) Applicant: Cogniac, Corp., San Jose, CA (US)

(72) Inventors: William S Kish, Saratoga, CA (US); Huayan Wang, Milpitas, CA (US); Sandip C. Patel, San Jose, CA (US); Yui Ming Tsang, Redwood City, CA (US)

(*) Notice: Subject to any disclaimer, the term of this patent is extended or adjusted under 35 U.S.C. 154(b) by 27 days.

(21) Appl. No.: 15/432,834

(22) Filed: Feb. 14, 2017

(51) Int. Cl.
| | |
|---|---|
| *G06K 9/00* | (2006.01) |
| *G06T 7/00* | (2017.01) |
| *G06K 9/66* | (2006.01) |
| *G06K 9/46* | (2006.01) |

(52) U.S. Cl.
CPC .......... *G06T 7/0002* (2013.01); *G06K 9/4604* (2013.01); *G06K 9/66* (2013.01)

(58) Field of Classification Search
CPC ............. G06K 9/00248; G06K 9/0061; G06K 9/6215; G06K 9/6267; G06T 2207/30196
See application file for complete search history.

(56) References Cited

U.S. PATENT DOCUMENTS

| | | | | |
|---|---|---|---|---|
| 2007/0263092 A1* | 11/2007 | Fedorovskaya | ... | G06F 17/30265 348/207.1 |
| 2009/0193055 A1* | 7/2009 | Kuberka | ............. | G06F 17/3028 |
| 2010/0195865 A1* | 8/2010 | Luff | ................... | G06K 9/00771 382/100 |
| 2011/0052049 A1* | 3/2011 | Rajaraman | ........... | G06Q 10/087 382/165 |
| 2014/0010450 A1* | 1/2014 | Suwa | ................. | G06K 9/00268 382/173 |
| 2016/0063516 A1* | 3/2016 | Terrazas | ............. | G06Q 30/0201 705/7.29 |
| 2018/0005068 A1* | 1/2018 | Zamfir | ..................... | G06K 9/40 |
| 2018/0114299 A1* | 4/2018 | Hattori | .................... | G06T 5/008 |

* cited by examiner

*Primary Examiner* — Li Liu
(74) *Attorney, Agent, or Firm* — Steven Stupp

(57) ABSTRACT

A computer system may train and use a machine-learning model to quantitatively analyze an image. In particular, the computer system may generate the machine-learning model based on a set of reference images that include content with instances of a quantitative feature attribute and one or more feedback metrics that specify locations of the instances of the quantitative feature attribute in the reference images and numerical values associated with the instances of the quantitative feature attribute. Then, after receiving the image from an electronic device, the computer system may analyze the image using the machine-learning model to perform measurements of one or more additional instances of the quantitative feature attribute in the image. Moreover, the computer system may provide a measurement result for the image, the measurement result including a second numerical value associated with the one or more additional instances of the quantitative feature attribute in the image.

18 Claims, 8 Drawing Sheets

MACHINE-LEARNING MEASUREMENTS OF QUANTITATIVE FEATURE ATTRIBUTES

BACKGROUND

Field

The described embodiments relate to a technique for performing measurements of quantitative feature attributes in an image using a machine-learning model, such as a neural network.

Related Art

Ongoing advances in the capabilities of electronic devices are making them increasingly popular. In addition, the widespread availability of electronic devices and their increasing functionality has resulted in a large number of applications.

For example, many electronic devices include imaging sensors, such as CMOS image sensors, that users and applications use to acquire images and videos. The content in these images and videos often includes useful information for the users. In principle, if the associated subset of the content that includes the information (which are sometimes referred to as 'features') can be accurately identified, additional value-added services can be provided to the users.

One approach for identifying features in images is to train a detector, such as a machine-learning model, that attempts to identify features on an electronic device (such as a computer system) using images in a training dataset. Then, the detector may be used on the electronic device or another electronic device to processes images.

Detectors based on machine-learning models are routinely used to perform classification based on the features in the images. For example, a detector can classify whether or not an individual is present in a picture or whether or not an object in an image is the Eiffel tower.

However, it can be difficult to accurately identify certain types of features in the images using existing machine-learning models. Consequently, these limitations can constrain the ability to extract certain types of information from the images, which can be frustrating for the users and can adversely impact the user experience.

SUMMARY

The described embodiments relate to a computer system that quantitatively analyzing an image. This computer system may include: an interface circuit that communicates, via a network, with an electronic device; memory that stores a program module and a set of reference images; and a processor that executes the program module to perform operations. During operation, the computer system may access, in the memory, the set of reference images that include content with instances of a quantitative feature attribute and one or more feedback metrics associated with the instances of the quantitative feature attribute, where, for a given reference image in the set of reference images, the one or more feedback metrics specify at least a location of at least an instance of the quantitative feature attribute in the given reference image and a numerical value associated with at least the instance of the quantitative feature attribute. Then, the computer system may generate a machine-learning model based on the set of reference images and the one or more feedback metrics. Moreover, the computer system may receive, from the electronic device, an image having additional content. Next, the computer system may analyze the image using the machine-learning model to perform measurements of one or more additional instances of the quantitative feature attribute in the image. Furthermore, the computer system may provide a measurement result for the image, the measurement result including a second numerical value associated with the one or more additional instances of the quantitative feature attribute in the image.

Note that at least the instance of the quantitative feature attribute may include multiple instances and the numerical value may include a count of the multiple instances of the quantitative feature attribute in the given reference image. Alternatively or additionally, the numerical value may correspond to a geometric length association with at least the instance of the quantitative feature attribute in the given reference image.

Moreover, the one or more feedback metrics may include one or more of: an offset of at least the instance of the quantitative feature attribute from an edge of the given reference image; an offset of at least the instance of the quantitative feature attribute from a location in the given reference image; a line in the given reference image that corresponds to at least the instance of the quantitative feature attribute; and an area in the given reference image that includes at least the instance of the quantitative feature attribute. Thus, the one or more feedback metrics may include reference information that specifies at least the location of at least the instance of the quantitative feature attribute.

Furthermore, the numerical value may include a cardinality of at least the instance of the quantitative feature attribute.

Additionally, the machine-learning model may include a neural network.

In some embodiments, the second numerical value specifies: a count of the one or more additional instances of the quantitative feature attribute in the image; and/or a geometric length association with the one or more additional instances of the quantitative feature attribute in the image. In these embodiments, the image may include information that, directly or indirectly (such as a magnification), specifies a size of at least a portion of the image.

Note that providing the measurement result may include transmitting the second numerical value.

Moreover, the measurement result may include information specifying one or more locations of the one or more additional instances of the quantitative feature attribute in the image.

Another embodiment provides an electronic device that includes an imaging sensor that captures the image and that executes a program module to perform at least some of the aforementioned operations.

Another embodiment provides a method for quantitatively analyzing an image, which may be performed by the computer system or the electronic device.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
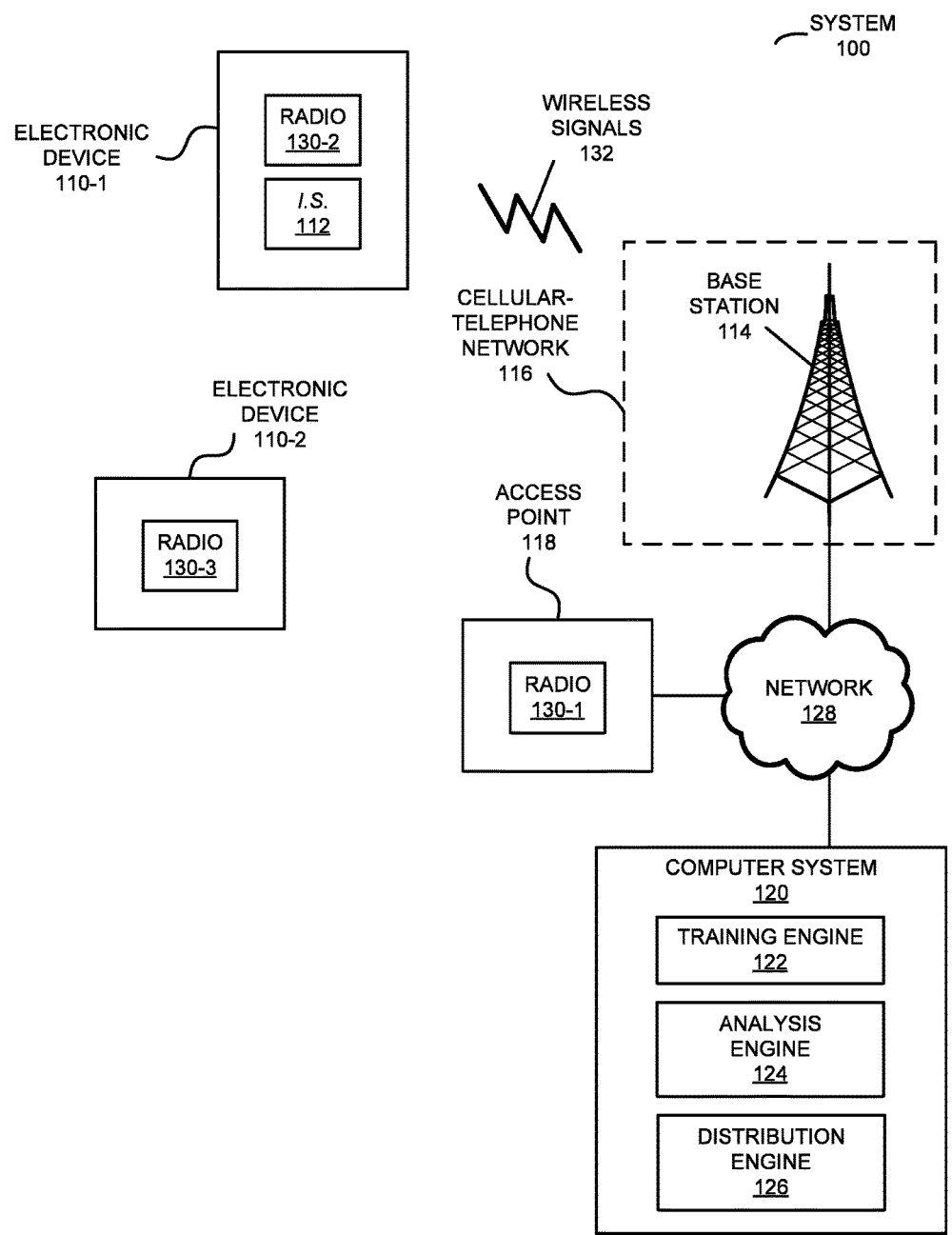
FIG. 1 is a block diagram illustrating an example of a system that trains one or more machine-learning models and quantitatively analyzes images in accordance with an embodiment of the present disclosure.

A computer system may train and use a machine-learning model (such as a neural network) to quantitatively analyze an image. In particular, the computer system may generate the machine-learning model based on a set of reference images that include content with instances of a quantitative feature attribute and one or more feedback metrics that specify locations of the instances of the quantitative feature attribute in the reference images and numerical values associated with the instances of the quantitative feature attribute. Then, after receiving the image from an electronic device, the computer system may analyze the image using the machine-learning model to perform measurements of one or more additional instances of the quantitative feature attribute in the image. Moreover, the computer system may provide a measurement result for the image, the measurement result including a second numerical value associated with the one or more additional instances of the quantitative feature attribute in the image.

By performing quantitative analysis of the image, this measurement technique may allow additional information to be extracted from the image. For example, the measurement result may include: a count of the number of the one or more additional instances of the quantitative feature attribute in the image; a geometric length associated with the one or more additional instances of the quantitative feature attribute in the image; and/or information specifying one or more location(s) of the one or more additional instances of the quantitative feature attribute in the image. Moreover, the accurate measurement results may facilitate additional value-added services that can be provided to users. Consequently, the measurement technique may provide flexible and accurate quantitative feature attribute analysis, and may improve the user experience when using viewing and using images.

In the discussion that follows, an individual or a user may be a person. Also, or instead, the measurement technique may be used by any type of organization, such as a business (which should be understood to include for-profit corporations), non-profit corporations, groups (or cohorts) of individuals, sole proprietorships, government agencies, partnerships, etc.

Moreover, in the discussion that follows, electronic devices and/or components in a system may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth® (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Ethernet and Wi-Fi are used as illustrative examples.

Communication among electronic devices is shown in FIG. 1, which presents a block diagram illustrating a system 100 that trains and quantitatively analyzes images using one or more machine-learning models. In particular, system 100 includes one or more electronic devices 110 (such as portable electronic devices, e.g., cellular telephones) at least some of which may include an optional imaging sensor (I.S.) 112 (such as a CMOS image sensor, a CCD, a camera, etc.), optional base station 114 in cellular-telephone network 116, optional access point 118 and/or a computer system 120 (such as a server), which are sometimes collectively referred to as 'components' in system 100. Moreover, computer system 120 may include: a training engine (or module) 122, an analysis engine (or module) 124, and/or a distribution engine (or module) 126.

Note that components in system 100 may communicate with each other via cellular-telephone network 116 and/or a network 128 (such as the Internet and/or a wireless local area network or WLAN). For example, distribution engine 126 in computer system 120 may provide one or more machine-learning models to one of electronic devices 110 (such as electronic device 110-1) via cellular-telephone network 116 and/or network 128. In addition, electronic device 110-1 may provide, via cellular-telephone network 116 and/or network 128, a notification (such as feedback about the operation of at least one of the one or more machine-learning models) to distribution engine 126. Thus, the communication in system 100 may be wired and/or wireless.

In embodiments where the communication involves wireless communication via a WLAN, the wireless communication includes: transmitting advertising frames on wireless channels, detecting another component in system 100 by scanning wireless channels, establishing connections (for example, by transmitting association requests, data/management frames, etc.), optionally configuring security options (e.g., Internet Protocol Security), and/or transmitting and receiving packets or frames via the connection (which may include information that specifies the one or more machine-learning models, the measurement results, etc.). Moreover, in embodiments where the communication involves wireless communication via cellular-telephone network 116, the wireless communication includes: establishing connections, and/or transmitting and receiving packets (which may include information that specifies the one or more machine-learning models, the measurement results, etc.).

Figure 7:
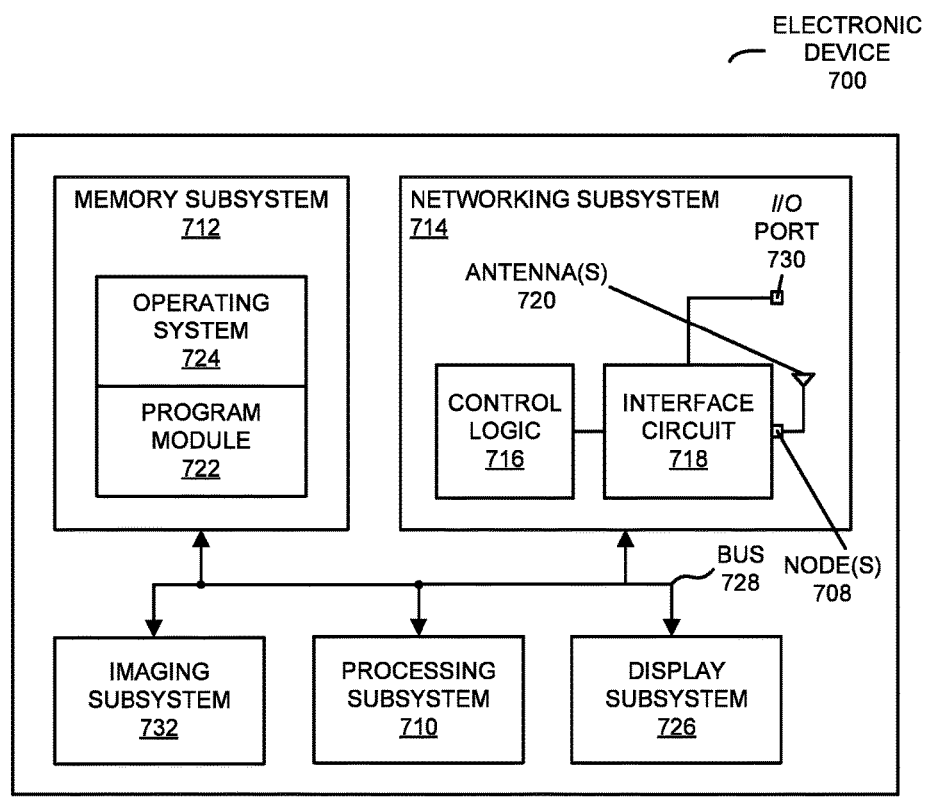
FIG. 7 is a block diagram illustrating an example of an electronic device in the system of FIG. 1 in accordance with an embodiment of the present disclosure.

As described further below with reference to FIG. 7, electronic devices 110, optional base station 114, optional access point 118 and/or computer system 120 may include subsystems, such as a networking subsystem, a memory subsystem and a processor subsystem. In addition, electronic devices 110, optional base station 114, optional access point 118 and/or computer system 120 may include radios 130 in the networking subsystems. More generally, the components can include (or can be included within) any electronic devices with the networking subsystems that enable these components to communicate with each other.

Moreover, as can be seen in FIG. 1, wireless signals 132 (represented by jagged lines) are transmitted by radios 130 in the components. For example, radio 130-1 in optional access point 118 may transmit information (such as frames or packets) using wireless signals 132. These wireless signals may be received by radios 130 in one or more of the other components, such as by electronic device 110-1. This may allow computer system 120 to communicate information to electronic device 110-1.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame (such as the one or more machine-learning models, measurement results, etc.).

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As discussed previously, it can be difficult to accurately identify certain types of features in the images using existing machine-learning models. In particular, while existing machine-learning models are routinely used to perform classification of features or content in images, it can be difficult to quantitatively analyze the features or content in the images.

As described further below with reference to FIGS. 2-5, in order to address this problem, training engine 122 may train or generate one or more machine-learning models based on a set of reference images that include content with instances of a quantitative feature attribute and one or more feedback metrics associated with the instances of the quantitative feature attribute, which may be stored and, thus, accessed in local or remotely located memory. For a given reference image in the set of reference images, the one or more feedback metrics may specify at least a location of at least an instance of the quantitative feature attribute in the given reference image and a numerical value associated with at least the instance of the quantitative feature attribute. For example, there be one or more instances of the quantitative feature attribute in the set of reference images and the numerical values may include counts of the one or more instances of the quantitative feature attribute in the set of reference images. Alternatively or additionally, the numerical values may correspond to geometric lengths association with the instances of the quantitative feature attribute in the set of reference images. Moreover, the numerical value may include cardinalities of the instances of the quantitative feature attribute in the set of reference images. Furthermore, the one or more feedback metrics may include reference information that specifies the locations of the instances of the quantitative feature attribute in the set of reference images.

Therefore, after the training, the one or more machine-learning model may be used to perform quantitative analysis on one or more images. For example, computer system 120 may receive, via network 128, one or more images with additional content from at least one of electronic devices 110, such as electronic device 110-1. The additional content may be different from the content in the set of reference images, but may include additional instances of the quantitative feature.

Then, analysis engine 124 may use at least one of the one or more machine-learning model to analyze the one or more images to perform measurements of one or more additional instances of the quantitative feature attribute in the one or more images. For example, as described further below with reference to FIGS. 4 and 5, the measurement results for one of the one or more images may include one or more second numerical values, such as a geometric length of an additional instance of the quantitative feature attribute or a count of a number of occurrences of the additional instances of the quantitative feature attribute in an image.

Note that the one or more second numerical values in the measurement results may fall within a parameter space defined by the range of numerical values of the instances of the quantitative feature attribute in set of reference images. Alternatively, the one or more second numerical values in the measurement results may be outside of the parameter space. In particular, once a given machine-learning model is trained to perform quantitative measurements of the geometric lengths or to count the number of instances of the quantitative feature attribute in the set of reference images, the machine-learning model may not be constrained to only analyze images with instances of the quantitative feature attribute that have numerical values of the geometric lengths or the count that are within the range of numerical values in the set of reference images.

This capability of the one or more machine-learning models may be different than existing machine-learning models. For example, the machine-learning model may be a neural network. Typical existing neural networks are generalized function approximators. Stated differently, typical existing neural networks are lossy compute compression engines. While these existing neural networks are capable of processing or analyzing large amounts of information to identify or classify (and thus to extract) desired information or features, they are usually constrained by the training dataset, so that the can only reliably identify or classify features that are similar to those on which the existing neural networks were trained.

In contrast, the one or more machine-learning models in the measurement technique may be trained to perform at least a mathematical operation on the additional instances of the quantitative feature attribute, such as counting a number of occurrences (i.e., addition), measurement of a geometric length or an angle (e.g., subtraction or comparison), determining a cardinality (such as identifying or classifying a number of different numerical values, and then counting the total number), etc. As such, this general mathematical capability of the one or more machine-learning models may accurately perform the measurements for second numerical values that are very different from the numerical values in the set of reference images. In order to facilitate the general mathematical capability, the one or more images may include information or metadata that directly or indirectly specifies a size of at least a portion of the image. For example, the information about the portion of the image may include a magnification of the image if the image was acquired using a different imaging sensor or a different magnification than the set of reference images.

After performing the measurements, computer system 120 may provide to one or more of electronic devices 110 at least a measurement results for one of the one or more images. The measurement result may include a second numerical value associated with the one or more additional instances of the quantitative feature attribute in the image. For example, computer system 120 may transmit a frame with the measurement result to electronic device 110-1. Note that the measurement result may include information specifying one or more locations of the one or more additional instances of the quantitative feature attribute in the image.

While the preceding discussion had computer system 120 performing the quantitative analysis using the one or more machine-learning models, in other embodiments one or more of electronic devices 110 (such as electronic device 110-1) performs the quantitative analysis. For example, distribution engine 126 may provide instructions for the one or more machine-learning models. Note that the instructions may include an architecture of the machine-learning model, weights associated with the machine-learning model, one or more libraries and/or a set of pre-processing transformations for use when executing the machine-learning model on the one or more images. In response, electronic device 110-1 may configure the machine-learning model based on the instructions. Then, electronic device 110-1 may analyze the one or more images using at least one of the machine-learning model.

Note that computer system 120 and/or electronic device 110-1 may select the machine-learning model based on metadata associated with the one or more images (such as an image context associated with the one or more images, e.g., one or more formats and/or one or more image characteristics of the one or more images, etc.). (Alternatively, the machine-learning model may have been pre-selected or pre-specified before the one or more images were received from or acquired by electronic device 110-1.)

In particular, the image context of the one or more images may be associated with or may include: a format (such as an aspect ratio, a resolution, a color space, etc.); a particular location (such as a fixed location or a variable location) of the source of the one or more images (i.e., a location of electronic device 110-1 when the one or more images were acquired); a type of the source (such as a type of imaging sensor 112); an identifier of the source; other features in the one or more images than the features (such as an object in the one or more images); an attribute of the one or more images (such as a location of a light source, a signal-to-noise ratio, a histogram of the light intensity in the one or more images, an f-number or a magnification, another metric of the light intensity, an image-quality metric, etc.); and/or a time of day the one or more mages were acquired. Then, if the metadata specifies one or more of these items, computer system 120 or electronic device 110-1 can select the machine-learning model out of the one or more available machine-learning models based on the metadata. In embodiments where distribution engine 126 provides the instructions for the one or more machine-learning models to electronic device 110-1, the instructions may specify the image context (and, thus, the machine-learning model). Alternatively or additionally, electronic device 110-1 may determine the image context. For example, the determination of the image context may be performed dynamically to improve a performance metric of the machine-learning model (such as accuracy of quantitative analysis).

Note that the machine-learning model may be implemented and executed on computer system 120 and/or electronic device 110-1 using or in conjunction with hardware (such as a processor, a graphical processing unit or GPU, etc.) and/or a software application, such as image-acquisition software and/or image-analysis software. This software application may be a standalone application or a portion of another application that is resident on and that executes on computer system 120 and/or electronic device 110-1 (such as a software application that is provided by computer system 120 and/or electronic device 110-1, or that is installed on and that executes on computer system 120 and/or electronic device 110-1). Alternatively or additionally, at least a portion of the software application executing on computer system 120 and/or electronic device 110-1 may be an application tool that is embedded in the web page, and that executes in a virtual environment of a web browser. Thus, the application tool may be provided to a user of computer system 120 and/or electronic device 110-1 via a client-server architecture. In an exemplary embodiment, the software application includes Caffe (from the Berkley Vision and Learning Center at the University of California, Berkley, Calif.) and, more generally, a deep-learning framework.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

Figure 2:
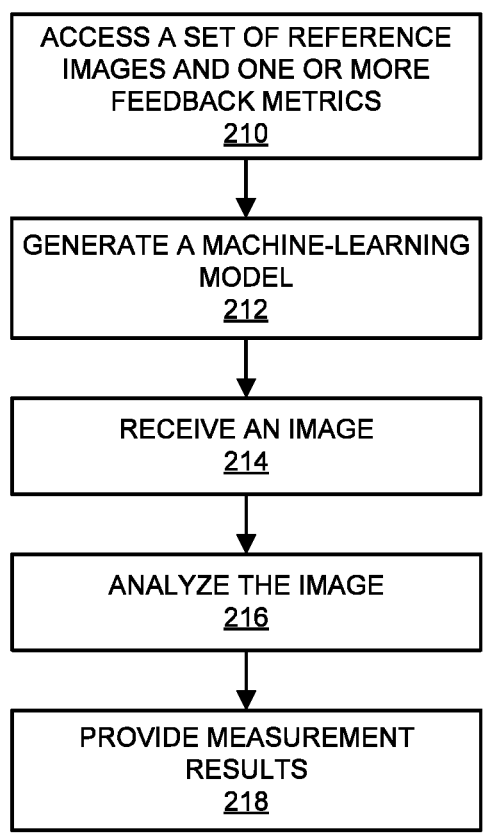
FIG. 2 is a flow diagram illustrating an example of a method for quantitatively analyzing an image in the system in FIG. 1 in accordance with an embodiment of the present disclosure.

FIG. 2 presents a flow diagram illustrating an example of a method 200 for quantitatively analyzing an image, which may be performed by a computer system (such as computer system 120 in FIG. 1). During operation, the computer system may access (operation 210), in memory, a set of reference images that include content with instances of a quantitative feature attribute (such as a few hundred instances) and one or more feedback metrics associated with the instances of the quantitative feature attribute, where, for a given reference image in the set of reference images, the one or more feedback metrics specify at least a location of at least an instance of the quantitative feature attribute in the given reference image and a numerical value associated with at least the instance of the quantitative feature attribute.

Note that at least the instance of the quantitative feature attribute may include multiple instances and the numerical value may include a count of the multiple instances of the quantitative feature attribute in the given reference image. Alternatively or additionally, the numerical value may correspond to a geometric length association with at least the instance of the quantitative feature attribute in the given reference image. Moreover, the numerical value may include a cardinality and/or a range of at least the instance of the quantitative feature attribute.

Furthermore, the one or more feedback metrics may include one or more of: an offset of at least the instance of the quantitative feature attribute from an edge of the given reference image (such as a distance from an edge pixel); an offset of at least the instance of the quantitative feature attribute from a location in the given reference image (such as a center of the given reference image); a line or distance in the given reference image that corresponds to at least the instance of the quantitative feature attribute; and an area in the given reference image that includes at least the instance of the quantitative feature attribute (such as a region that include or surrounds the instance of the quantitative feature attribute). Thus, the one or more feedback metrics may include reference information that specifies at least the location of at least the instance of the quantitative feature attribute.

Then, the computer system may generate a machine-learning model (operation 212) based on the set of reference images and the one or more feedback metrics. In particular, the computer system may train the machine-learning model using the set of reference images and the one or more feedback metrics. This training may iterate until a desired or target accuracy is achieved, such as 70, 80, 90 or 95%. For example, the machine-learning model may perform quantitative measurements on the instances of the quantitative feature attributes in the set of reference images (i.e., a training dataset) based on the one or more feedback metrics, analyze one or more images to determine measurement results, and the computer system may compare the measurement results with the one or more feedback metrics to determine the accuracy during an iteration of the training. Note that the machine-learning model may include a neural network.

Moreover, the computer system may receive, from an electronic device, an image (operation 214) having additional content.

Next, the computer system may analyze the image (operation 216) using the machine-learning model to perform measurements of one or more additional instances of the quantitative feature attribute in the image. For example, the second numerical value may specify: a count of the one or more additional instances of the quantitative feature attribute in the image; and/or a geometric length association with the one or more additional instances of the quantitative feature attribute in the image. In these embodiments, the image may include information that, directly or indirectly (such as a magnification), specifies a size of at least a portion of the image. Moreover, the measurement result may include information specifying one or more locations of the one or more additional instances of the quantitative feature attribute in the image.

Furthermore, the computer system may provide a measurement result (operation 218) for the image, the measurement result including a second numerical value associated with the one or more additional instances of the quantitative feature attribute in the image. For example, the measurement result may be provided to the electronic device and/or another electronic device, such as by transmitting the second numerical value.

In this way, the computer system (for example, software executed in an environment, such as an operating system, of the computer system) may ensure that the machine-learning model can quantitatively analyze the image to determine the measurement results. This capability may facilitate automation and other value-added services, and thus enhance the user experience when using the electronic device and/or the computer system.

In some embodiments of method 200, there may be additional or fewer operations. Moreover, the order of the operations may be changed, and/or two or more operations may be combined into a single operation.

Figure 3:
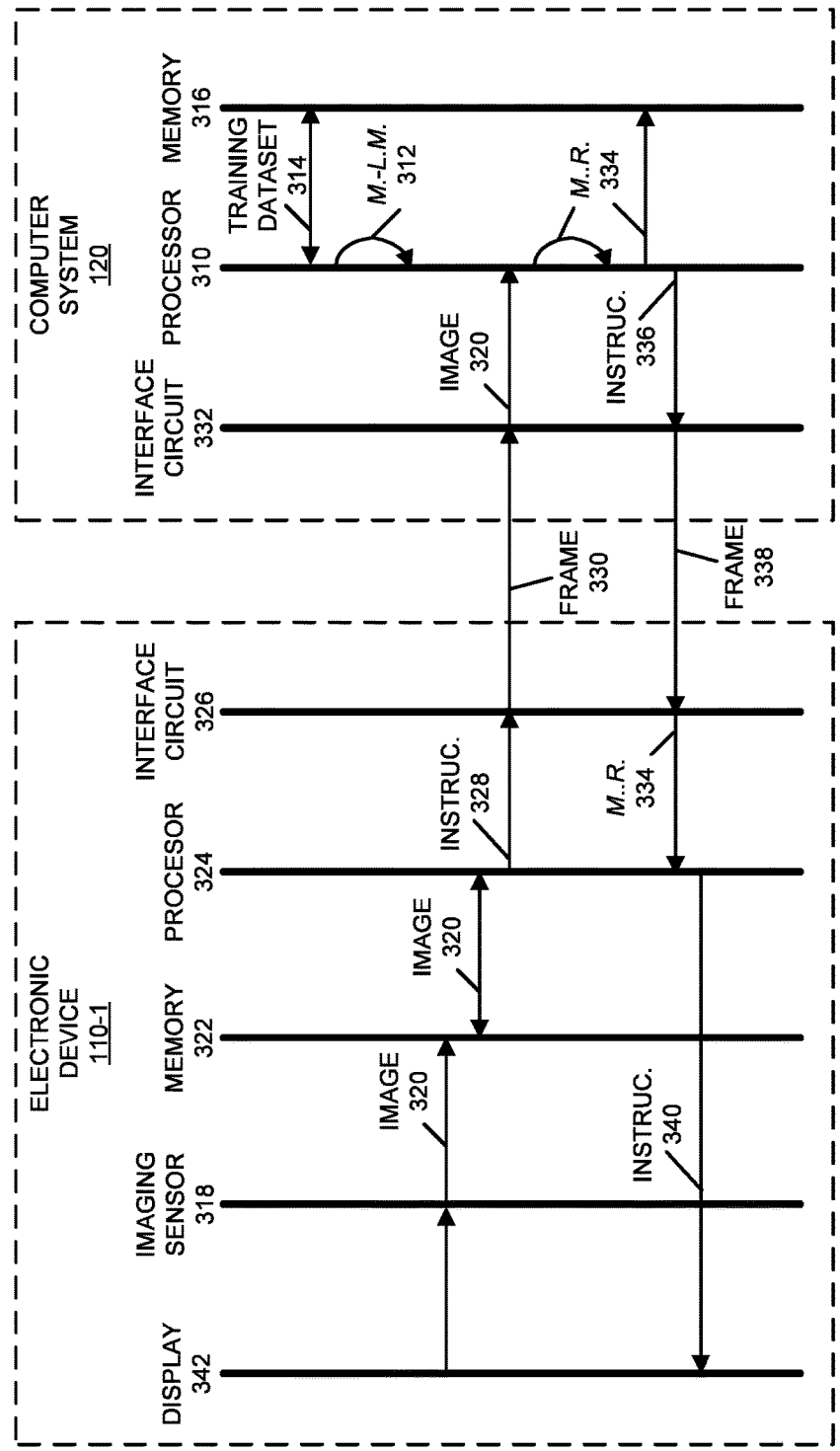
FIG. 3 is a drawing illustrating an example of communication among components in the system in FIG. 1 in accordance with an embodiment of the present disclosure.

Embodiments of the measurement technique are further illustrated in FIG. 3, which presents a drawing illustrating an example of communication among components in system 100 (FIG. 1). In particular, during measurement technique, processor 310 in computer system 120 (which may include or may be executing training engine 122 in FIG. 1) may train a machine-learning model (M.-L. M.) 312 using a training dataset 314 that includes the set of reference images and the one or more feedback metrics, which may be accessed in memory 316.

Subsequently, imaging sensor 318 in electronic device 110-1 may acquire an image 320, which is stored in memory 322. Moreover, processor 324 may access image 320 and may instruct 328 interface circuit 326 to provide image 320 to computer system 120.

In response, interface circuit 326 may transmit a frame 330 with image 320 to computer system 120. After receiving frame 330, interface circuit 332 in computer system 120 may provide image 320 to processor 310. Processor 310 may execute machine-learning model 312 to determine measurement results 334 by quantitatively analyzing image 320, and may store measurement results 334 in memory 316.

Then, processor 310 may instruct 336 interface circuit 332 to provide measurement results 334 to electronic device 110-1. In response, interface circuit 332 may transmit frame 338 to electronic device 110-1. After receiving frame 338, interface circuit 326 may provide measurement results 334 to processor 324, which may instruct 340 a display 342 to present or display measurement results 334 to a user of electronic device 110-1.

Figure 4:
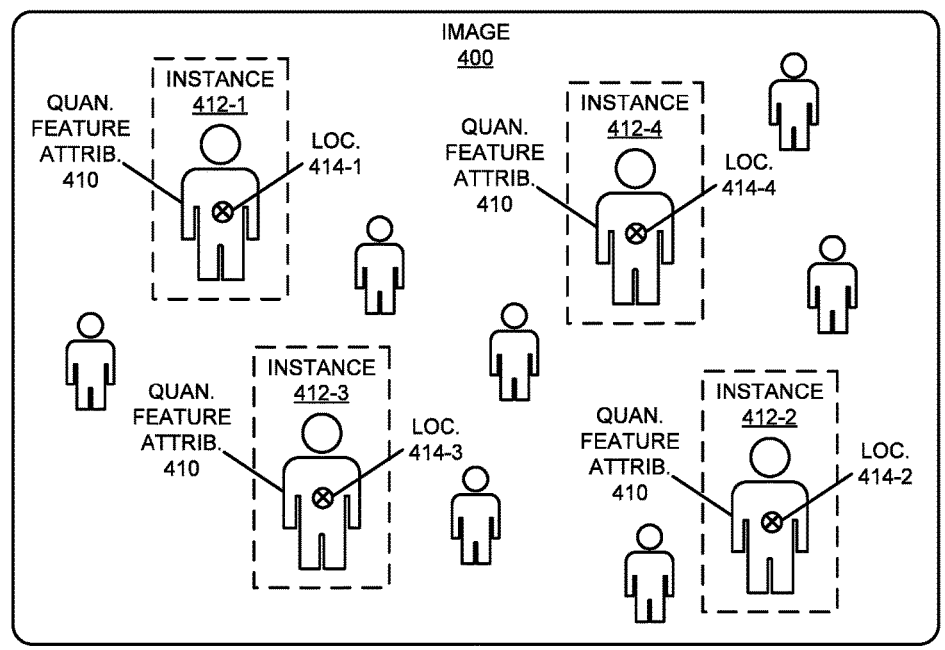
FIG. 4 is a drawing illustrating an example of quantitative analysis of an image using the system in FIG. 1 in accordance with an embodiment of the present disclosure.

We now describe examples of quantitative feature attributes in an image. FIG. 4 presents a drawing illustrating an example of quantitative analysis of an image 400 using system 100 in FIG. 1. In particular, image 400 includes multiple instances 412 of a quantitative feature attribute 410, such as people in a crowd having particular attributes. For example, quantitative feature attribute 410 may include individuals taller than a particular minimum height (such as 5'4").

Thus, the measurement results output or provided by the machine-learning model may include a count of the number of instances 412 (such as four). This may involve a combination of identification or classification (i.e., determining those individuals that are taller than a minimum height) and addition or summation to determine the count. Note that identification may involve the machine-learning model making an association with an attribute or subject tag associated with quantitative feature attribute 410, such as 'person' or 'human.' In some embodiments, the measurement results may include information specifying locations 414 of instances 412 of quantitative feature attribute 410 in image 400.

While the preceding example illustrated the use of the measurement technique to count the number of people taller than a minimum height, in other embodiments the one or more feedback metrics associated with the set of reference images may include a cardinality of the instances of the quantitative feature attribute, such as people at specified locations in the reference images who have heights in predefined ranges (such as between 5' and 5'6", between 5'6" and 6', etc.). In these embodiments, the measurement results may include counts of the number of people in image 400 that have heights in the predefined ranges (i.e., a set of numerical values instead of a single numerical value).

Figure 5:
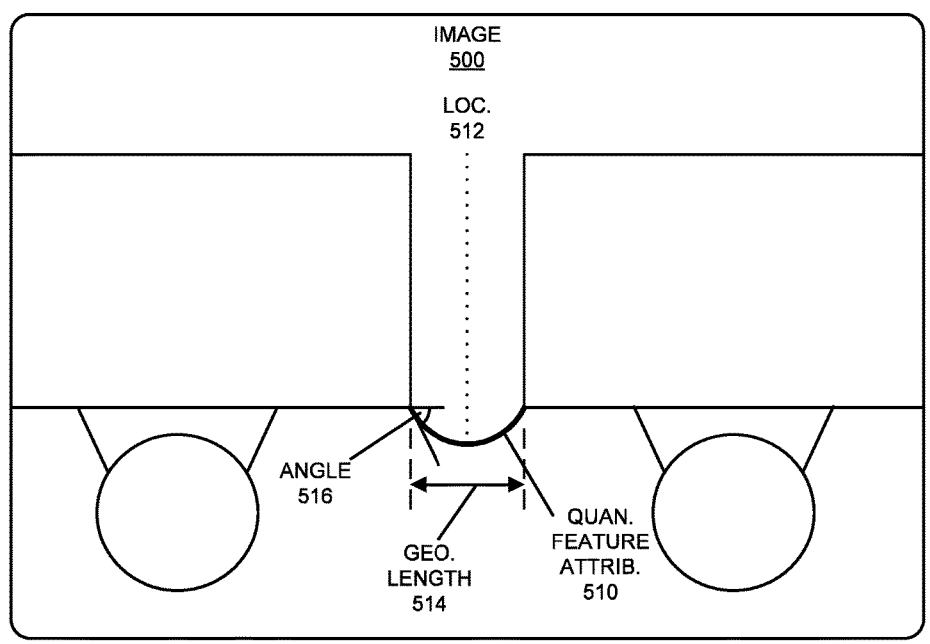
FIG. 5 is a drawing illustrating an example of quantitative analysis of an image using the system in FIG. 1 in accordance with an embodiment of the present disclosure.

FIG. 5 presents a drawing illustrating an example of quantitative analysis of an image 500 using system 100 in FIG. 1. In particular, image 500 includes an instances of a quantitative feature attribute 510 at a location 512. Quantitative feature attribute 510 may have a geometric length 514 and/or an angle 516 associated with it. For example, quantitative feature attribute 510 may be a brake cable on a train that is susceptible to damage if geometric length 514 and/or angle 516 are incorrect or outside of a range of acceptable values. Alternatively, quantitative feature attribute 510 may be a spacing between rails that can cause a train derailment if it is larger than an acceptable upper bound. Consequently, the measurement results output or provided by the machine-learning model may include a numerical value of geometric length 514 and/or angle 516. This capability may facilitate automated visual inspection of quantitative feature attribute 510. In some embodiments, geometric length 514 and/or angle 516 may be measured based on the number of pixels in image 500.

Thus, the machine-learning model may be trained for use with a variety of applications, including classification, detection and/or quantitative measurements.

As noted previously, in order to facilitate the quantitative analysis using the machine-learning model, image 500 may include information that, directly (such as a reference scale or length) or indirectly (such as a magnification), specifies a size of at least a portion of image 500. This additional information or metadata may allow the machine-learning model to quantitatively analyze images that may have different formats and/or magnifications than those in the set of reference images.

In an exemplary embodiment, the machine-learning model in the measurement technique includes a supervised-learning model or an unsupervised-learning model. Moreover, the machine-learning model may include or may be based on supervised or machine-learning techniques, such as: a neural network (e.g., a convolutional neural network), support vector machines, classification and regression trees, logistic regression, LASSO, linear regression and/or another (linear or nonlinear) supervised-learning technique. Furthermore, the machine-learning model may have: invariance to specific transformations (e.g., similarity transformations, affine transformations, etc.); robustness to photometric distortions and noise; computational efficiency; and, depending on the particular task, the ability to generalize to feature or object categories. Furthermore, the machine-learning model may include one or more of: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a motion detector (such as a Gaussian-mixture model), etc.

The machine-learning model may be trained using quantitative labeled data, such as one or more instances of the quantitative feature attribute and one or more associated feedback metrics in one or more reference images. Moreover, the machine-learning model may be trained using metadata associated with the reference images, such as: a location where an image was acquired, a type of source, an identifier of a particular source, an attribute of the reference image, image-quality metrics, a time of day, etc. For example, a training module executed by the computer system may perform hyper-parameter optimization in a multi-dimensional space of parameters to determine one or more machine-learning models (such as 1000 machine-learning models) based on quantitative labeled data and the metadata, so that the best performing machine-learning model(s) for particular quantitative feature attributes and/or images can be determined. Note that in some embodiments the machine-learning model(s) are trained using back propagation based on the quantitative labeled data.

Figure 6:
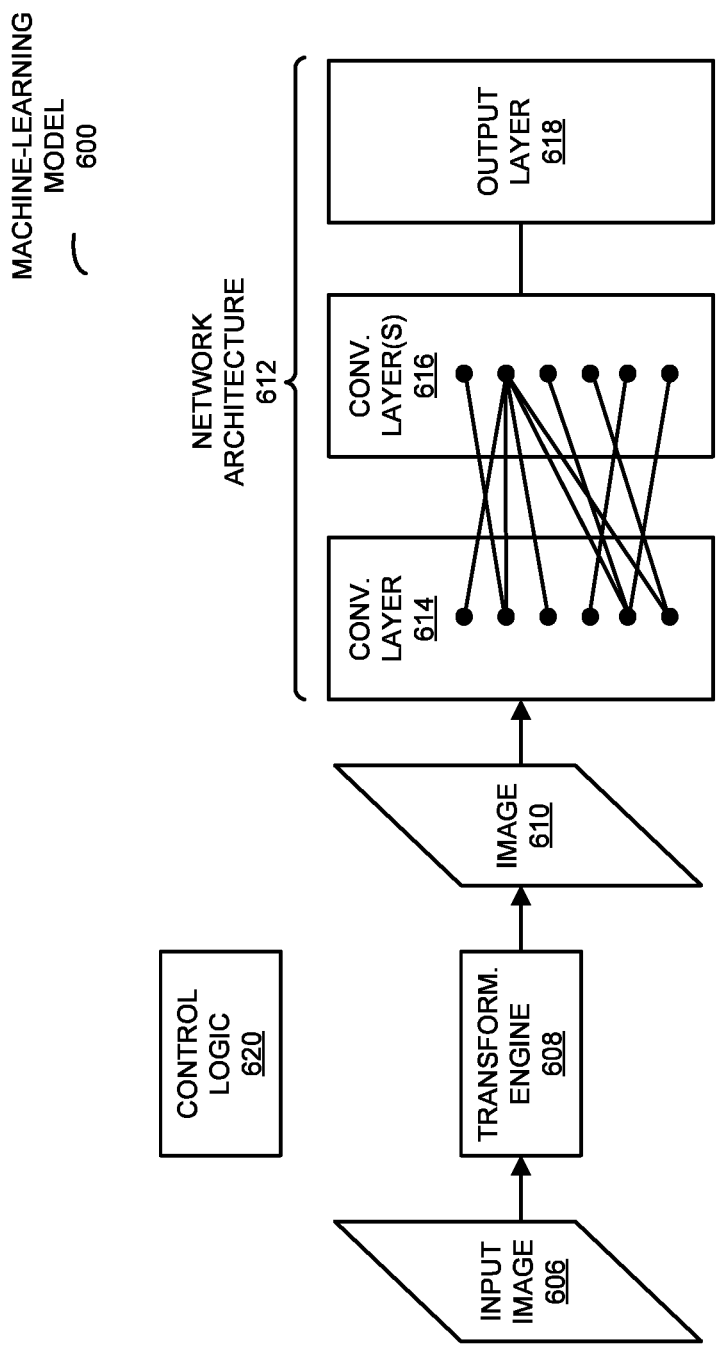
FIG. 6 is a drawing illustrating an example of a machine-learning model in accordance with an embodiment of the present disclosure.

As shown in FIG. 6, which presents a drawing illustrating an example of a machine-learning model 600. In particular, machine-learning model 600 may be implemented using a convolutional neural network. This neural network may include a network architecture 612 that includes: an initial convolutional layer 614 that provides filtering of image 610; an additional convolutional layer(s) 616 that apply weights; and an output layer 618 (such as a rectified linear layer) that performs quantitative measurements (e.g., counting a number of instances of a quantitative feature attribute or determining a geometric length of a quantitative feature attribute). Note that the details with the different layers in machine-learning model 600, as well as their interconnections, may define network architecture 612 (such as a directed acyclic graph). These details may be specified by the instructions for machine-learning model 600. In some embodiments, machine-learning model 600 is reformulated as a series of matrix multiplication operations.

Machine-learning model 600 may be able to handle the real-world variance in 1 million images or more. However, machine-learning model 600 may be trained or developed based on input image 610 having a particular format (such as 256×256 bits, i.e., a square aspect ratio). Thus, machine-learning model 600 may have an input receptive field that expects a particular type of input. Nonetheless, in general an initial input image 606 may have a different format. For example, relative to image 610, image 606 may have one of a variety of file formats (such as JPEG), a different size, a different resolution, etc. Thus, in order to analyze image 606 using machine-learning model 600, it may need to be transformed using one or more pre-processing transformations by transformation engine, module or circuit 608 into image 610. Note that the one or more pre-processing transformations may include: cropping (such as center cropping), mapping (such as rescaling), data augmentation (such as changing an aspect ratio), changing a color space (such as to RGB), changing a resolution (such as from greyscale [0, 255] to [0, 1] or [−0.5, 0.5]), etc.

The instructions for machine-learning model 600 may specify the one or more pre-processing transformations performed by transformation engine 608. Alternatively, control logic 620 may analyze image 606 to determine an image context and then, based on the image context, may select the one or more pre-processing transformations performed by transformation engine 608. Thus, in some embodiments, the one or more pre-processing transformations (and, more generally, front-end processing of image 606) may be optimized (such as by using hyper-parameter optimization).

Note that machine-learning model 600 may be used to analyze an image or a sequence of images, such as video acquired at a frame rate of, e.g., 700 frames/s.

In some embodiments, machine-learning model 600 includes layers of detectors. These model features may be reused in different machine-learning models (as opposed to randomly retraining a new machine-learning model).

We now describe an exemplary embodiment of a neural network. In a typical training regime, a large convolutional network model may include 60 M parameters and 650,000 neurons. The convolutional network model may include eight learned layers with weights, including five convolutional layers and three fully connected layers with a final 1000-way softmax that produces a distribution over the 1000 class labels. Some of the convolution layers may be followed by max-pooling layers. In order to make training faster, the convolutional network model may use non-saturating neurons (such as a local response normalization) and an efficient dual parallelized GPU implementation of the convolution operation. In addition, in order to reduce overfitting in the fully-connected layers, a regularization technique (which is sometimes referred to as 'dropout') may be used. In dropout, the predictions of different models are efficiently combined to reduce test errors. In particular, the output of each hidden neuron is set to zero with a probability of 0.5. The neurons that are 'dropped out' in this way do not contribute to the forward pass and do not participate in backpropagation. Note that the convolutional network model may maximize the multinomial logistic regression objective, which may be equivalent to maximizing the average across training cases of the log-probability of the correct label under the prediction distribution.

In some embodiments, the kernels of the second, fourth, and fifth convolutional layers are coupled to those kernel maps in the previous layer that reside on the same GPU. The kernels of the third convolutional layer may be coupled to all kernel maps in the second layer. Moreover, the neurons in the fully connected layers may be coupled to all neurons in the previous layer. Furthermore, response-normalization layers may follow the first and second convolutional layers, and max-pooling layers may follow both response-normalization layers as well as the fifth convolutional layer. A nonlinear model of neurons, such as Rectified Linear Units, may be applied to the output of every convolutional and fully-connected layer.

In an exemplary embodiment, the first convolutional layer filters a 224×224×3 input image with 96 kernels of size 11×11×3 with a stride of four pixels (this is the distance between the receptive field centers of neighboring neurons in a kernel map). Note that the second convolutional layer may take as input the (response-normalized and pooled) output of the first convolutional layer and may filter it with 256 kernels of size 5×5×48. Furthermore, the third, fourth, and fifth convolutional layers may be coupled to one another without any intervening pooling or normalization layers. The third convolutional layer may have 384 kernels of size 3×3×256 coupled to the (normalized, pooled) outputs of the second convolutional layer. Additionally, the fourth convolutional layer may have 384 kernels of size 3×3×192, and the fifth convolutional layer may have 256 kernels of size 3×3×192. The fully-connected layers may have 4096 neurons each. Note that the numerical values in the preceding and the remaining discussion below are for purposes of illustration only, and different values may be used in other embodiments.

In some embodiments, the convolutional network model is implemented using at least two GPUs. One GPU may run some of the layer parts while the other runs the remaining layer parts, and the GPUs may communicate at certain layers. The input of the convolutional network model may be 150,528-dimensional, and the number of neurons in the remaining layers in the convolutional network model may be given by 253,440-186,624-64,896-64,896-43,264-4096-4096-1000.

The convolutional network model may be pre-trained on a quantitative training dataset. During the training, the convolutional network model may be repeatedly subjected to the training image set and retrained using a backpropagation technique, in which errors in the output from the convolutional network model may be used as feedback to adjust the parameters in the convolutional network model until the output error in the measurement results reaches some minimum level (such as 1, 5, 10, 20 or 30%).

Once a trained measurement model is available for a particular application, it can be deployed as part of the system or downloaded from the system for remote deployment (i.e., to one or more electronic devices, such as cellular telephones). When a model is deployed as part of the system, images input into the system may be analyzed using a particular machine-learning model based on a per-application configuration. The input images may then be processed by the previously trained per-application convolutional neural network to produce an output result unique to the application. Moreover, the output result may include measurement results for the quantitative feature attributes associated with the application. In some embodiments, output coordinates specifying the location of the quantitative feature attributes in the input image can also be produced by the convolutional neural network.

While the images that are analyzed by the machine-learning model(s) may include content in the visible spectrum, in other embodiments other types of content may be analyzed. Thus, the input data may include a variety of other types of content, including: audio, measurements of an environmental condition (such as the temperature, humidity, barometric pressure, wind direction, wind speed, reflected sunlight, etc.), images associated with different wavelengths of light (such as infrared images, ultraviolet images or x-ray images), acoustic imaging (such as ultrasound or seismic measurements), radar images, an arbitrary type of data or information, etc. In some embodiments, the images are of at least a portion of an individual (instead of an environment). Thus, the images processed by the computer system and/or the electronic device may include medical images or medical information, such as data from: computed tomography, magnetic resonance imaging, an electroencephalogram, an ultrasound, positron emission spectroscopy, an x-ray, etc.

Moreover, while the preceding discussion illustrated the use of a particular machine-learning model to analyze an image, in other embodiments a set of multiple machine-learning models are used concurrently. In this ensemble approach, over time the best performing machine-learning models for a particular image, quantitative feature attribute may be identified from the set of machine-learning models.

Furthermore, in the preceding discussion, the source of the input data included a physical camera or an imaging sensor. However, in other embodiments the source may include a 'virtual camera', such as an electronic device, computer or server that provides images to the electronic device for analysis. Thus, the measurement technique may be used to analyze images that have recently been acquired, to analyze images that are stored in the computer system or the electronic device and/or to analyze images received from other electronic devices. For example, the measurement technique may be used to analyze images associated with a social network of interacting individuals who exchange or post content, including images.

We now describe embodiments of an electronic device. FIG. 7 presents a block diagram illustrating an example of an electronic device 700, such as one of electronic devices 110, optional base station 114, optional access point 118 and/or computer system 120 in FIG. 1. This electronic device includes processing subsystem 710, memory subsystem 712, and networking subsystem 714. Processing subsystem 710 includes one or more devices configured to perform computational operations. For example, processing subsystem 710 can include one or more microprocessors, one or more GPUs, one or more application-specific integrated circuits (ASICs), one or more microcontrollers, one or more programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program module 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Figure 8:
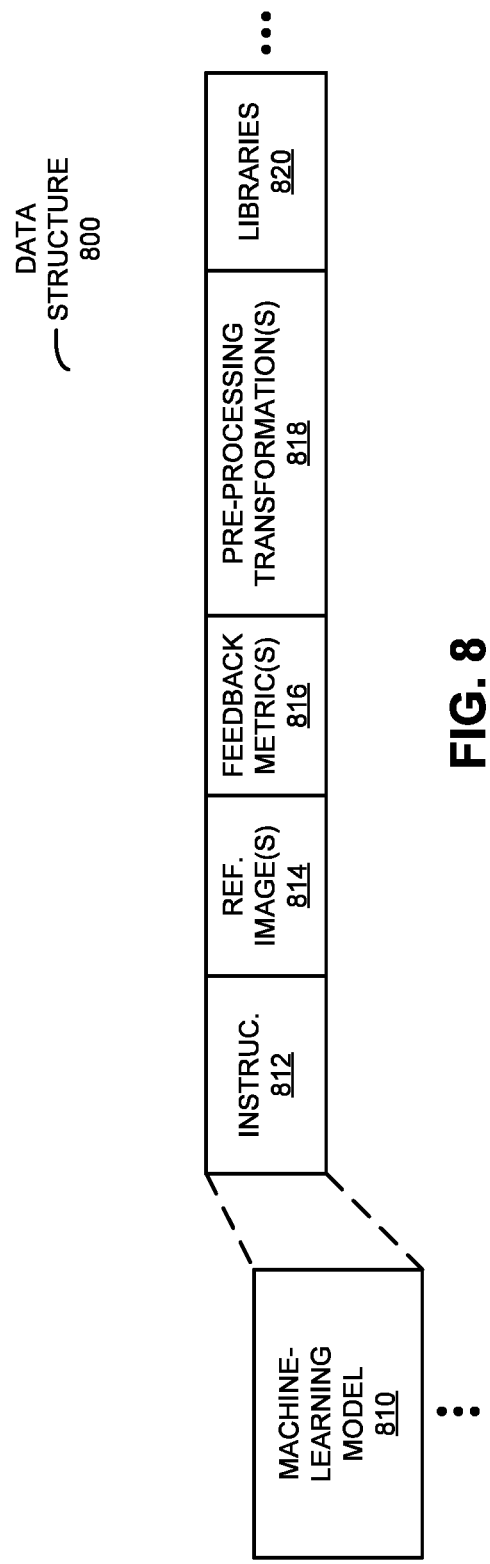
FIG. 8 is a drawing illustrating an example of a data structure that is used by the electronic device in FIG. 7 in accordance with an embodiment of the present disclosure.

Memory subsystem 712 may store information associated with one or more machine-learning models. This is shown in FIG. 8, which presents an example of a data structure 800. In particular, data structure 800 may include: instructions 812 for a machine-learning model 810 (such as a neural network), a set of reference images (or inputs) 814, one or more feedback metrics 816 for the set of reference images 814, optionally one or more pre-processing transformations 818 to apply to set of reference images 814, and/or optionally one or more libraries 820. Note that instructions 812 may include an architecture of machine-learning model 810 (which is sometimes referred to as a 'network architecture') and/or weights associated with machine-learning model 810.

Referring back to FIG. 7, networking subsystem 714 includes one or more devices configured to couple to and communicate on a wired and/or wireless network (i.e., to perform network operations), including: control logic 716, an interface circuit 718, one or more antennas 720 and/or input/output (I/O) port 730. (While FIG. 7 includes one or more antennas 720, in some embodiments electronic device 700 includes one or more nodes 708, e.g., a pad, which can be coupled to one or more antennas 720. Thus, electronic device 700 may or may not include one or more antennas 720.) For example, networking subsystem 714 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc. Moreover, electronic device 700 may optionally include an imaging subsystem 732 with one or more imaging sensors for acquiring or capturing one or more images. (More generally, electronic device 700 may include a monitoring subsystem with one or more sensors for monitoring or measuring in an environment or of an individual.) Alternatively, electronic device 700 may receive the one or more images from another electronic device using networking subsystem 714.

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a smartwatch, a consumer-electronic device, a portable computing device, an access point, a router, a switch, communication equipment, test equipment, a security camera, an aviation drone, a nanny camera, a wearable appliance, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, display subsystems and/or audio subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments, some or all of a given subsystem or component can be integrated into one or more of the other subsystems or component(s) in electronic device 700. For example, in some embodiments program module 722 is included in operating system 724.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 714, such as a radio. Moreover, the integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.)

While communication protocols compatible with Ethernet and Wi-Fi were used as illustrative examples, the described embodiments of the measurement technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement technique may be implemented using program module 722, operating system 724 (such as a driver for interface circuit 718) and/or in firmware in interface circuit 718. Alternatively or additionally, at least some of the operations in the measurement technique may be implemented in a physical layer, such as hardware in interface circuit 718.

In the preceding description, we refer to 'some embodiments.' Note that 'some embodiments' describes a subset of all of the possible embodiments, but does not always specify the same subset of embodiments. Moreover, note that the numerical values provided are intended as illustrations of the communication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
    an interface circuit configured to communicate, via a network, with an electronic device;
    memory configured to store a program module and a set of reference images; and
    a processor, coupled to the interface circuit and the memory, configured to execute the program module to perform operations comprising:
        accessing, in the memory, the set of reference images that include content with instances of a quantitative feature attribute and one or more feedback metrics associated with the instances of the quantitative feature attribute, wherein, for a given reference image in the set of reference images, the one or more feedback metrics specify at least a location of at least an instance of the quantitative feature attribute in the given reference image and a numerical value associated with at least the instance of the quantitative feature attribute, and
        wherein at least the instance of the quantitative feature attribute includes multiple instances and the numerical value includes a count of the multiple instances of the quantitative feature attribute in the given reference image;
        generating a machine-learning model based on the set of reference images and the one or more feedback metrics;
        receiving, from the electronic device, an image having additional content;
        analyzing the image using the machine-learning model to perform measurements of one or more additional instances of the quantitative feature attribute in the image; and
        providing a measurement result for the image, the measurement result including a second numerical value associated with the one or more additional instances of the quantitative feature attribute in the image.

2. The computer system of claim 1, wherein the numerical value corresponds to a geometric length association with at least the instance of the quantitative feature attribute in the given reference image.

3. The computer system of claim 1, wherein the one or more feedback metrics include one or more of: an offset of at least the instance of the quantitative feature attribute from an edge of the given reference image; an offset of at least the instance of the quantitative feature attribute from a location in the given reference image; a line in the given reference image that corresponds to at least the instance of the quantitative feature attribute; and an area in the given reference image that includes at least the instance of the quantitative feature attribute.

4. The computer system of claim 1, wherein the numerical value includes a cardinality of at least the instance of the quantitative feature attribute.

5. The computer system of claim 1, wherein the machine-learning model includes a neural network.

6. The computer system of claim 1, wherein the second numerical value specifies at least one of: a count of the one or more additional instances of the quantitative feature attribute in the image; and a geometric length association with the one or more additional instances of the quantitative feature attribute in the image.

7. The computer system of claim 1, wherein providing the measurement result includes transmitting the second numerical value.

8. The computer system of claim 1, wherein the measurement result includes information specifying one or more locations of the one or more additional instances of the quantitative feature attribute in the image.

9. A method for quantitatively analyzing an image, comprising:
by a processor:
accessing, in memory, a set of reference images that include content with instances of a quantitative feature attribute and one or more feedback metrics associated with the instances of the quantitative feature attribute, wherein, for a given reference image in the set of reference images, the one or more feedback metrics specify at least a location of at least an instance of the quantitative feature attribute in the given reference image and a numerical value associated with at least the instance of the quantitative feature attribute, and
wherein at least the instance of the quantitative feature attribute includes multiple instances and the numerical value includes a count of the multiple instances of the quantitative feature attribute in the given reference image;
generating a machine-learning model based on the set of reference images and the one or more feedback metrics;
receiving, from an electronic device, the image having additional content;
analyzing the image using the machine-learning model to perform measurements of one or more additional instances of the quantitative feature attribute in the image; and
providing a measurement result for the image, the measurement result including a second numerical value associated with the one or more additional instances of the quantitative feature attribute in the image.

10. The method of claim 9, wherein the machine-learning model includes a neural network.

11. A non-transitory computer-readable storage medium for use in conjunction with a computer system, the computer-readable storage medium configured to store software that, when executed by the computer system, causes the electronic device to:
access, in memory, a set of reference images that include content with instances of a quantitative feature attribute and one or more feedback metrics associated with the instances of the quantitative feature attribute, wherein, for a given reference image in the set of reference images, the one or more feedback metrics specify at least a location of at least an instance of the quantitative feature attribute in the given reference image and a numerical value associated with at least the instance of the quantitative feature attribute, and
wherein at least the instance of the quantitative feature attribute includes multiple instances and the numerical value includes a count of the multiple instances of the quantitative feature attribute in the given reference image;
generate a machine-learning model based on the set of reference images and the one or more feedback metrics;
receive, from an electronic device, an image having additional content;
analyze the image using the machine-learning model to perform measurements of one or more additional instances of the quantitative feature attribute in the image; and
provide a measurement result for the image, the measurement result including a second numerical value associated with the one or more additional instances of the quantitative feature attribute in the image.

12. The computer-readable storage medium of claim 11, wherein the numerical value corresponds to a geometric length association with at least the instance of the quantitative feature attribute in the given reference image.

13. The computer-readable storage medium of claim 11, wherein the one or more feedback metrics include one or more of: an offset of at least the instance of the quantitative feature attribute from an edge of the given reference image; an offset of at least the instance of the quantitative feature attribute from a location in the given reference image; a line in the given reference image that corresponds to at least the instance of the quantitative feature attribute; and an area in the given reference image that includes at least the instance of the quantitative feature attribute.

14. The computer-readable storage medium of claim 11, wherein the numerical value includes a cardinality of at least the instance of the quantitative feature attribute.

15. The computer-readable storage medium of claim 11, wherein the machine-learning model includes a neural network.

16. The computer-readable storage medium of claim 11, wherein the second numerical value specifies at least one of: a count of the one or more additional instances of the quantitative feature attribute in the image; and a geometric length association with the one or more additional instances of the quantitative feature attribute in the image.

17. The computer-readable storage medium of claim 11, wherein providing the measurement result includes transmitting the second numerical value.

18. The computer-readable storage medium of claim 11, wherein the measurement result includes information specifying one or more locations of the one or more additional instances of the quantitative feature attribute in the image.

* * * * *